US006959963B2

United States Patent
Hunter et al.

(10) Patent No.: US 6,959,963 B2
(45) Date of Patent: Nov. 1, 2005

(54) DISPOSABLE SANITARY SEAT COVER

(75) Inventors: Deidre J. Hunter, Denver, CO (US); Nancy B. Hulsey, Kirkwood, MO (US)

(73) Assignee: Herbistic Enterprises, LLC, Manhattan Beach, CA (US)

( * ) Notice: Subject to any disclaimer, the term of this patent is extended or adjusted under 35 U.S.C. 154(b) by 0 days.

(21) Appl. No.: 10/695,659

(22) Filed: Oct. 27, 2003

(65) Prior Publication Data

US 2004/0135407 A1 Jul. 15, 2004

Related U.S. Application Data

(63) Continuation of application No. 10/226,811, filed on Aug. 22, 2002, now Pat. No. 6,655,734.
(60) Provisional application No. 60/316,436, filed on Aug. 30, 2001.

(51) Int. Cl.[7] .............................................. A47C 31/00
(52) U.S. Cl. ........................ 297/219.12; 297/228.11; 297/256.17
(58) Field of Search .......................... 297/219.1, 224, 297/219.12, 228.11, 256.17, 221–222; 4/245.4, 244.2, 245.3, 245.1, 245.8

(56) References Cited

U.S. PATENT DOCUMENTS

| 711,981 A | 10/1902 | Lankenau |
| 1,301,779 A | 4/1919 | Young |
| 1,452,552 A | 4/1923 | Frear |
| 1,912,363 A | 6/1933 | De Waide |
| 2,313,311 A | 3/1943 | Arter, Jr. et al. |
| 3,753,262 A | * 8/1973 | Watsky ........................ 4/244.2 |
| 3,929,135 A | 12/1975 | Thompson |
| 4,030,676 A | 6/1977 | Bardsley |
| 4,469,734 A | 9/1984 | Minto et al. |
| 4,627,117 A | 12/1986 | Morishita |
| 4,820,294 A | 4/1989 | Morris |
| 4,887,321 A | * 12/1989 | MacLean ..................... 4/245.5 |
| 4,920,584 A | * 5/1990 | Abdrabbo .................... 4/245.1 |
| 5,309,586 A | 5/1994 | Sies et al. |
| 5,500,063 A | 3/1996 | Jessup |
| 5,537,693 A | * 7/1996 | Dossola et al. .............. 4/245.4 |

(Continued)

FOREIGN PATENT DOCUMENTS

| DE | 1953 831 | 4/1971 |
| DE | 26 14 160 A1 | 10/1977 |
| DE | 32 48 790 C1 | 9/1984 |
| EP | 0 598 970 A1 | 11/1992 |
| EP | 0 872 199 A2 | 10/1998 |
| EP | 1 190 658 A1 | 9/2002 |
| FR | 2 587 892 | 4/1987 |

(Continued)

*Primary Examiner*—Milton Nelson, Jr
(74) *Attorney, Agent, or Firm*—Hogan & Hartson L.L.P.

(57) ABSTRACT

A disposable sanitary seat cover includes a base sheet having a seat cover area provided with passages that are adapted for providing an opening through the seat cover area for a child's legs. Passages are provided on the seat cover area through which a safety belt may be positioned.

9 Claims, 7 Drawing Sheets

U.S. PATENT DOCUMENTS

| | | |
|---|---|---|
| 5,641,200 A | 6/1997 | Howell |
| 5,678,888 A | 10/1997 | Sowell et al. |
| 5,791,732 A | 8/1998 | Lucree |
| 5,810,437 A | 9/1998 | Sharpe |
| 5,829,835 A | 11/1998 | Rogers et al. |
| 5,848,797 A | 12/1998 | Paez |
| 5,853,859 A | 12/1998 | Levy et al. |
| 5,855,412 A | 1/1999 | Smith et al. |
| 5,897,165 A | 4/1999 | Kucharczyk et al. |
| 5,967,606 A | 10/1999 | Bergh et al. |
| 6,001,460 A | 12/1999 | Morman et al. |
| 6,036,264 A | 3/2000 | Lucree |
| D423,176 S | 4/2000 | Cherry et al. |
| 6,065,655 A | 5/2000 | Parewick |
| 6,096,668 A | 8/2000 | Abuto et al. |
| 6,129,417 A | 10/2000 | Cohen-Fyffe |
| 6,129,418 A | 10/2000 | Bergh et al. |
| 6,164,721 A | 12/2000 | Latshaw et al. |
| 6,197,138 B1 | 3/2001 | McNichols |
| 6,207,637 B1 | 3/2001 | Pike et al. |
| 6,224,152 B1 | 5/2001 | Hughes et al. |
| 6,237,998 B1 | 5/2001 | Aprile |
| 6,382,290 B2 | 5/2002 | McNichols |
| 6,484,328 B1 * | 11/2002 | Frazier .......... 4/661 |
| 6,532,595 B1 * | 3/2003 | Holmes .......... 2/48 |

FOREIGN PATENT DOCUMENTS

| | | |
|---|---|---|
| FR | 2587892 * | 4/1987 |
| FR | 2 623 175 | 5/1989 |
| FR | 2 773 054 | 12/1997 |
| GB | 2 049 758 A | 12/1980 |
| GB | 2 176 216 A | 12/1986 |
| GB | 2186 006 A | 8/1987 |
| GB | 2 208 667 | 12/1989 |
| WO | WO 88/01844 | 3/1988 |

* cited by examiner

DISPOSABLE SANITARY SEAT COVER

CROSS-REFERENCE TO RELATED APPLICATIONS

The present application is a continuation of U.S. patent application Ser. No. 10/226,811, filed Aug. 22, 2002 now U.S. Pat No. 6,655,734 which claims priority from U.S. Provisional Patent Application Ser. No. 60/316,436, filed Aug. 30, 2001, the entire disclosures of which are specifically incorporated herewith by this reference.

BACKGROUND OF THE INVENTION

The present invention relates to hygiene products, and more particularly to disposable sanitary seat covers, and methods for making and using the same.

A recent study by the University of Arizona concluded that shopping carts are among the most contaminated objects with which consumers regularly come into contact. Infants, toddlers, and small children often accompany their parents on shopping trips. Frequently, children are restrained in the child seat of a shopping cart, thereby bringing the children into contact with the contaminated surface of the shopping cart. It would be desirable to limit the child's contact with the shopping cart to reduce the likelihood of illness or disease that may result from contact with the contaminated surface of the shopping cart.

In that regard, child seat covers are known in the art. By way of example, U.S. Pat. Nos. 5,678,888, 6,129,417, 6,237,998, and U.S. Design Pat. No. 423,176 describe various shopping cart seat covers. Similarly, U.S. Pat. Nos. 5,967,606, 6,065,655, and 6,129,418 describe cushions for shopping carts. U.S. Pat. Nos. 5,855,412 and 5,829,835 describe diaper bags that convert into shopping cart seat covers. U.S. Pat. Nos. 5,641,200, 5,791,732, 5,810,437, 5,848,797, 6,036,264, 6,164,721, and 6,224,152 describe various embodiment of seats adapted to be used in or with shopping carts.

While each of the devices described in the aforementioned patents may be effective, at least initially, the devices suffer from a number of drawbacks. Each of the devices is a multi-use device. Each time the device contacts a contaminated surface, the sanitary effectiveness of the device is reduced. Ultimately, the device may become as contaminated as the shopping cart surface, rendering the device ineffective. In addition, many of the devices include structural components that make the devices large, bulky, and difficult to transport. Further, routine wear and tear causes the quality of the product to degrade over time.

Thus, it would be desirable to have a disposable sanitary seat cover that provides a barrier to the transmission of contaminants between the seat and users of the seat. In addition, because the disposable sanitary seat cover is replaced each time a new child uses the seat, it would be a further benefit to advertisers to have a removable coupon attached to the sanitary seat cover.

SUMMARY OF THE INVENTION

To address these and other needs, the present invention provides a disposable sanitary seat cover readily adapted for use with public seat facilities for children, such as child seats in shopping carts or high chairs in restaurants. The present invention also provides methods for making disposable sanitary seat covers and structures for assembling a plurality of disposable seat covers into a pre-packaged, dispensable pack. Further, the present invention provides a dispenser that may be mounted on a wall or other suitable structure. In one embodiment, a consumer may remove a seat cover from the dispenser and apply the seat cover to the public seating facility prior to placing the child into the seat. The seat cover reduces contact between the child and the seat, thereby reducing the likelihood that the child will be exposed to any contaminants on the seat. After use, the seat cover may be removed and discarded.

In an exemplary embodiment, the present invention provides a disposable sanitary seat cover comprising a first sheet of material having a front side and a back side, the sheet defining a seat portion; and an adhesive strip secured to back side of the material.

In another exemplary embodiment, the present invention provides a pre-packaged, dispensable set of disposable seat covers, comprising a plurality of disposable seat covers, wherein each disposable sanitary seat cover comprises a first sheet of material having a front side and a back side, the sheet defining a seat portion and means for securing the seat portion to a seat. The plurality of disposable seat covers define a continuous web of material having a length extending along a longitudinal axis. The continuous web of material may be wound around a central axis to form a roll, and adjacent seat covers may be separated by a perforated section to facilitate removal of the sanitary seat cover from the web of material.

In another exemplary embodiment, the present invention provides a pre-packaged, dispensable set of disposable seat covers comprising a plurality of disposable seat covers, wherein each disposable sanitary seat cover comprises a first sheet of material having a front side and a back side, the sheet defining a seat portion and means for securing the seat portion to a seat. The plurality of disposable seat covers may be placed adjacent one another in a stack.

In yet another exemplary embodiment, the invention provides a system for dispensing disposable sanitary seat covers. The system comprises a dispenser including a housing defining an interior chamber and at least one passage in a wall of the housing, and a pre-packaged set of disposable seat covers disposed in the interior chamber of the housing, wherein a disposable seat cover may be removed through the at least one passage in the wall of the housing.

DETAILED DESCRIPTION

Figure 1:
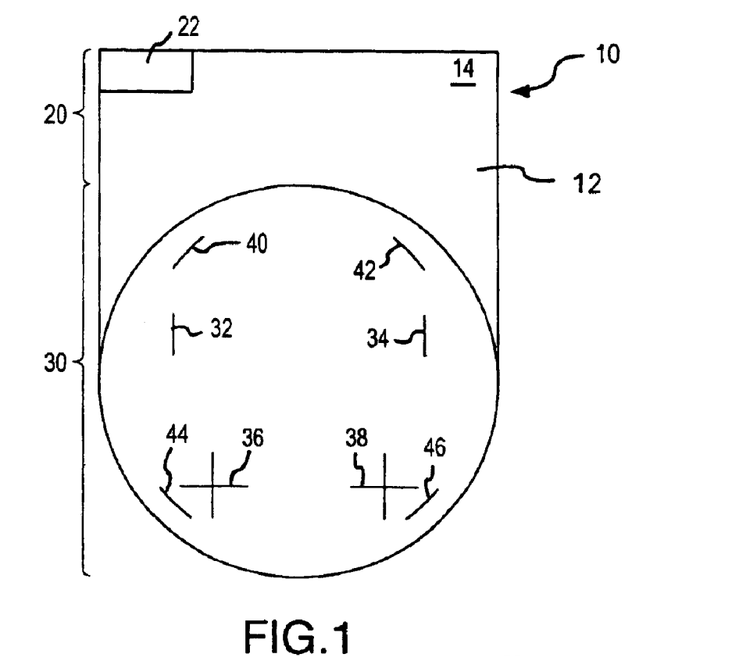
FIG. 1 is a top plan view of an exemplary embodiment of a disposable sanitary seat cover of the present invention.
Figure 2:
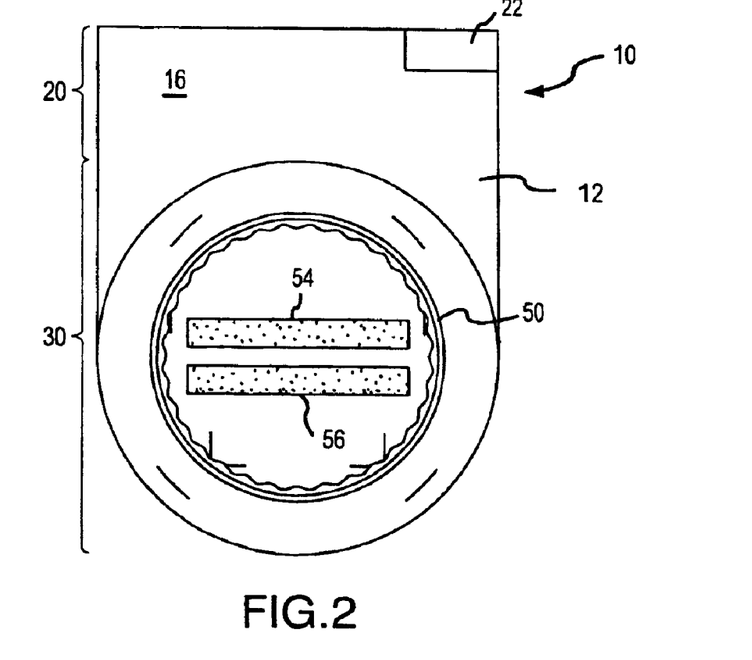
FIG. 2 is a bottom plan view of an exemplary embodiment of a disposable sanitary seat cover of the present invention.

FIGS. 1–2 are front and back plan views, respectively, of an exemplary embodiment of a disposable sanitary seat cover in accordance with the present invention. Referring to FIGS. 1–2, a disposable sanitary seat cover 10 includes a base sheet 12 of material having a front surface 14 and a back, or rear, surface 16. In use, the back surface may be positioned against the seat being covered, while the front surface contacts the user of the cover. It will be appreciated that the terms "front" and "back" are selected arbitrarily; either side may be considered the front or the back.

Seat cover 10 includes a seat portion 30 and an optional flap portion 20 depending from the seat portion 30. Flap portion 20 may include one or more removable sections 22 onto which, in practice, coupons or other useful consumer information may be printed. Removable section 22 may be a perforated section, such that removable section 22 can be torn from the flap portion 20. Alternatively, removable section 22 may be removably adhered to either the front surface 14 or the rear surface 16 of flap section 20, i.e., removable section 22 may be an adhesive sticker. It will be appreciated that seat portion 30 may also include one or more removable sections for coupons or other consumer information.

Seat portion 30 includes a plurality of passages that permit objects to pass through the plane of the base sheet 12. In an exemplary embodiment, the passages may be implemented as perforations that permit the user to create an aperture in the base sheet 12. In alternate embodiments, the passages may be formed in the sheet during the manufacturing process and, if necessary, reinforced with stitching or other reinforcing techniques suitable to the particular material from which base sheet 12 is manufactured. Seat portion 30 includes a first passage 32 and a second passage 34 positioned and dimensioned such that, in use, restraining devices such as a shopping cart's seat belt may be passed through the passages 32, 34. In an exemplary embodiment, passages 32, 34 measure approximately three inches in length and are formed approximately eight inches from the edge of the cover. Seat portion 30 further includes a third passage 36 and a fourth passage 38 positioned and dimensioned such that, in use, a child's legs may pass through the passages 36, 38. In an exemplary embodiment, passages 36, 38 are formed as a cross, each line of which measures approximately six inches in length and are formed approximately ten to twelve inches from the edge of the cover. While the seat portion 30 depicted in the exemplary embodiment is substantially circular in plan view, it will be appreciated that the particular shape of the seat portion is not critical to the present invention, and the seat portion could be formed in other shapes, e.g., rectangle, square, ellipse, oval, etc.

In use, cover 10 may be secured to the shopping cart, high chair, or other underlying seat structure. Several structural features described herein may be used alone or in combination to secure the seat cover to the underlying seat. Seat portion 30 may include a fifth passage 40, sixth passage 42, seventh passage 44, and eighth passage 46 positioned and dimensioned to permit the cover 10 to "hook" onto corners of a shopping cart seat or a high-chair. Alternatively, or in addition, cover 10 may include an elastic band 50 that may be stitched, adhered or otherwise attached to the cover 10. While the embodiment depicted in FIGS. 1–2 shows a substantially circular elastic band, it will be appreciated that the elastic band may be formed into other shapes, e.g., rectangle, square, ellipse, oval, etc. Alternatively, or in addition, cover 10 may include one or more adhesive strips 54, 56 that adhere the seat portion 30 to the underlying seat to which the disposable seat cover 10 is secured. Adhesive strips 54, 56 may be covered with a high-gloss paper or other suitable cover that may be peeled off prior to use. In addition, the peel strips may be printed with product information, including advertising and/or coupons for particular products. Preferably, the adhesive strips have a peel strength that permits the seat cover to remain secured to the seat in use and readily removed when the cover 10 is discarded. Other options for securing the seat cover on the seat include, but are not limited to, using drawstrings, snaps, buttons, Velcro, hook-and-eye, ties/strings/laces, clips, zippers, or any combination of these.

The particular dimensions of cover 10 are not critical to the present invention. Cover 10 may be produced in a variety of different sizes to accommodate shopping carts, high chairs, or other seats of different dimensions. In an exemplary embodiment, the seat section forms a circle having a radius of approximately fourteen inches, while the cover sheet measures approximately ten inches by twenty-eight inches.

Figure 3:
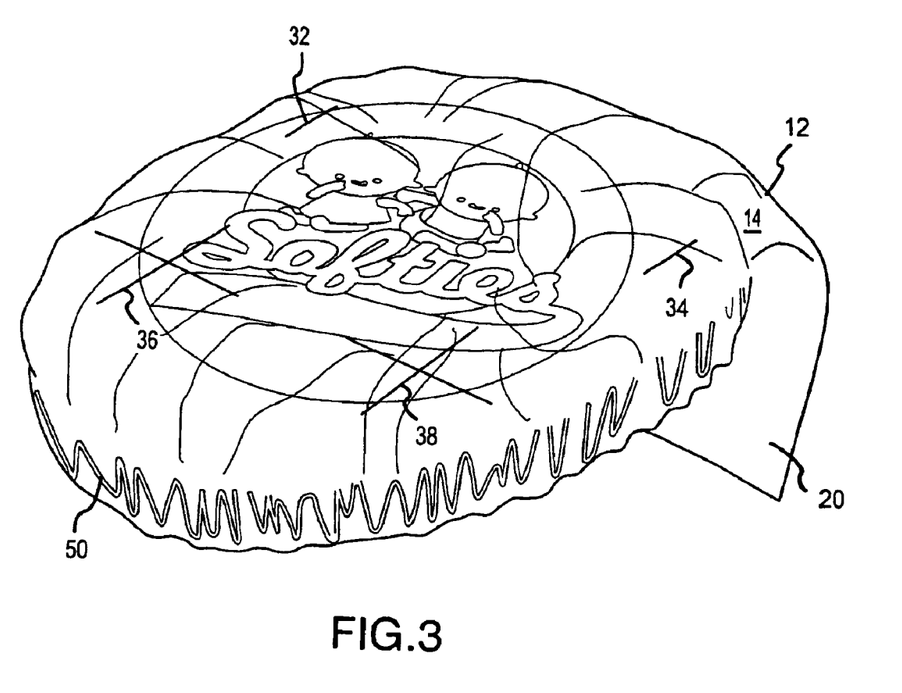
FIG. 3 is a perspective view of an exemplary embodiment of a disposable sanitary seat cover of the present invention.

FIG. 3 is a perspective view of an exemplary embodiment of a disposable sanitary seat cover 10 of the present invention. The embodiment depicted in FIG. 3 relies on elastic band 50 to secure the cover 10 to the underlying seat. Perforated passages 32, 34, 36, and 38 are visible on the front surface 14 of the base sheet 12. The flap portion 20 depends from the seat portion 30 of cover 10. FIG. 3 illustrates that cover 10, and particularly the front surface 14 of cover 10, presents valuable advertising space. Thus, cover 10 may come pre-printed with advertising for various products and/or services. Removable section 22 may include advertising information, e.g., addresses, phone numbers, special offers, product samples, coupons, etc., associated with the product or service advertised on cover 10.

Figure 4:
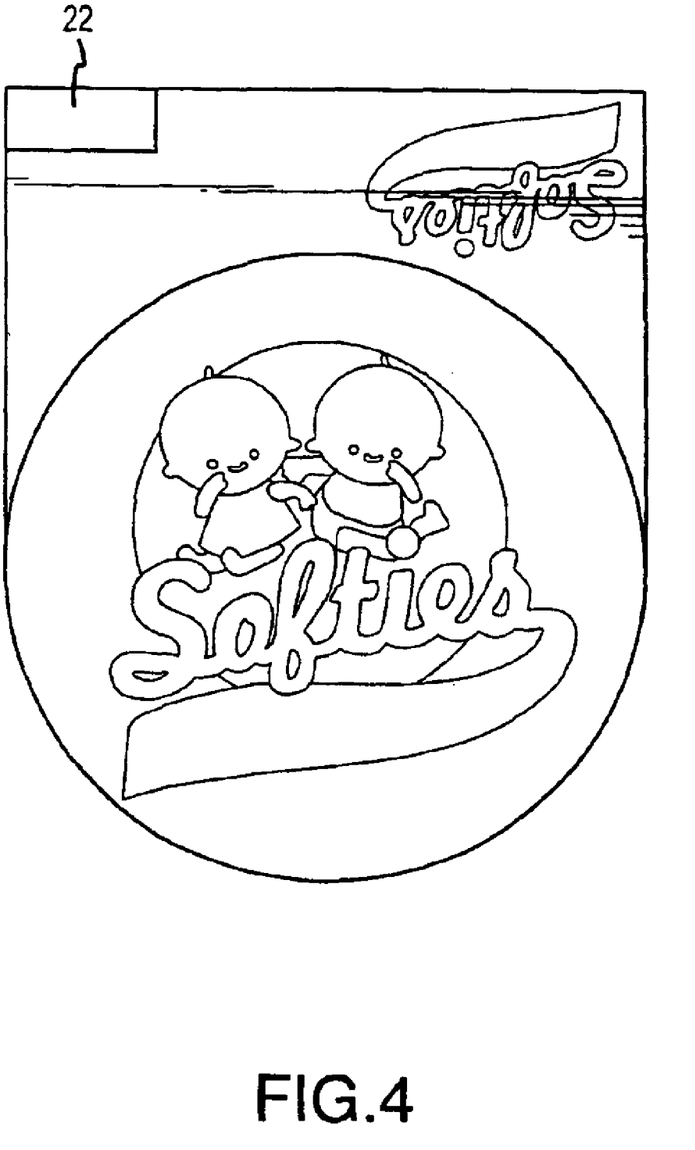
FIG. 4 is another top plan view of an exemplary embodiment of a disposable sanitary seat cover of the present invention.

FIG. 4 is another top plan view of an exemplary embodiment of a disposable sanitary seat cover of the present invention that better illustrates the advertising potential of cover 10. Referring to FIG. 4, the seat portion 30 and the flap portion 20 of seat cover include advertising for a particular product. Removable section 22 may include a coupon or other product information as described above.

Figure 5:
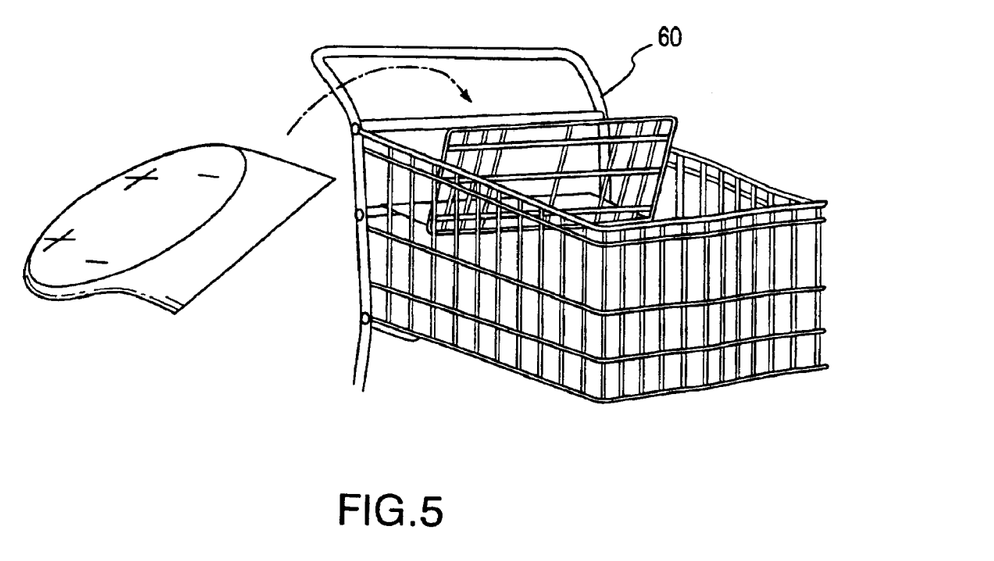
FIGS. 5–6 illustrate a sequence of steps involved in securing an exemplary embodiment of a disposable sanitary seat cover to a shopping cart seat in accordance with the present invention.
Figure 6:
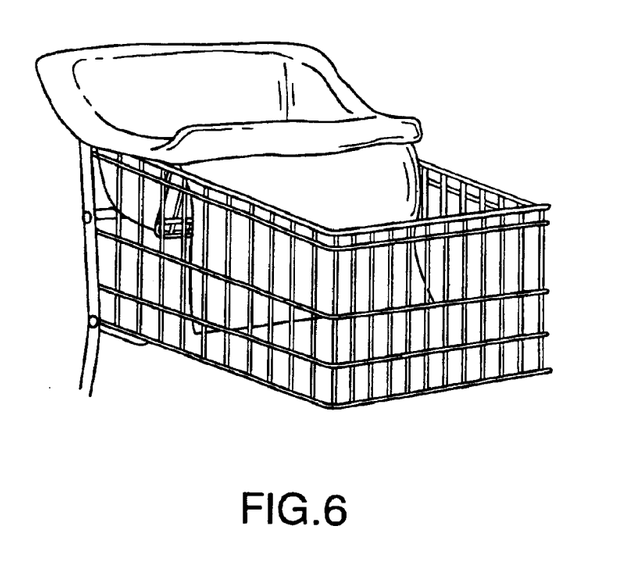

FIGS. 5–6 illustrate a sequence of steps involved in securing an exemplary embodiment of a disposable sanitary seat cover to a shopping cart seat in accordance with the present invention. Referring to FIG. 5, a seat cover 10 is positioned to be applied to a shopping cart seat 60. To apply the cover 10 to the seat, a user may simply hook the elastic band to the corners of the frame portion of the shopping cart seat 60, as illustrated in FIG. 6. Alternatively, if the base sheet includes passages 40, 42, 44, and 46, a user may simply hook these passages over the corners of the frame portion of the shopping cart seat. If cover 10 includes adhesive strips 54, 56 then the user may adhere these strips to the bottom of the shopping cart seat 60. As illustrated in FIG. 6, seat cover 10 provides a barrier between its occupant and the underlying shopping cart seat 60, thereby reducing contact with the contaminated surface of the shopping cart. Advantageously, when a child's legs are pushed through the perforations that define passages 36, 38, the seat cover remains around the child's legs, providing extra protection from the surrounding contaminated surface. Other options for passages 32, 34, 36, and 38 include, but are not limited to, using no openings (for infant seats that stores provide and which rest on top of the seating area), different shape perforated openings, one large opening for both legs, holes with finished or sewn edges, holes with elastic edges (similar to the elastic edging around the whole seat cover), or a combination of sewn, elastic and/or perforated openings.

One embodiment of the Disposable Sanitary seat cover does not have it's own seatbelt, but provides passages that permit the patron to use an existing, appropriate seatbelt provided with the shopping cart, highchair, etc. Another embodiment comes with a washable seatbelt that secures the child by weaving through the perforated seatbelt opening on one side of the child, around the back of the seating area, back in through the perforated seatbelt opening on the other side and fastened in front of the child. For example, a seatbelt may be provided with a package of disposable seat covers. The seat belt can use a variety of closing/opening fixtures and may be completely washable.

Figure 7:
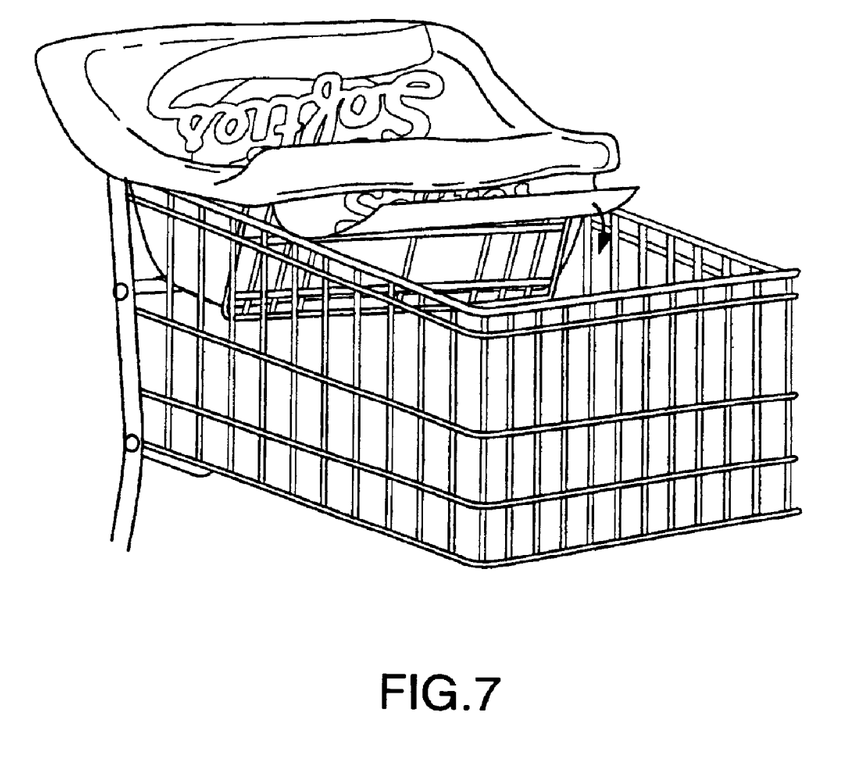
FIG. 7 is a perspective view of an exemplary embodiment of a disposable sanitary seat cover secured to the seat of a shopping cart.

FIG. 7 is a perspective view illustrating a seat cover 10 printed with advertising positioned on a shopping cart seat. It will be apparent from FIG. 7 that cover 10 provides valuable advertising space.

Figure 8:
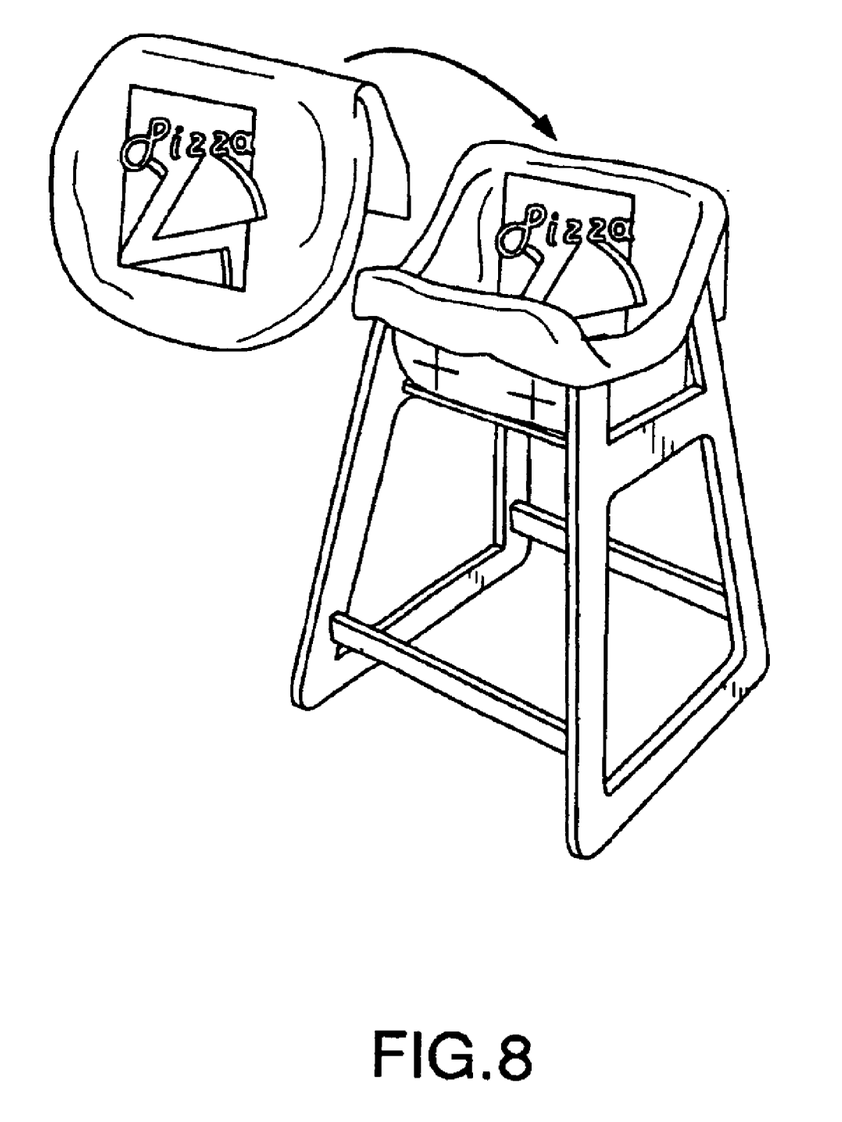
FIG. 8 demonstrates securing an alternate embodiment of a disposable sanitary seat cover to a high-chair.

FIG. 8 is a perspective view of a disposable sanitary seat cover 10 on a high-chair representative of the type used in restaurants. Seat cover 10 may be secured to the high chair seat in substantially the same manner as described above.

Base sheet 12 may be a substantially planar material formed from, e.g., a suitable polymer or non-woven fiber material, both of which are widely used in the hygiene products industry, or a composite or laminate thereof. Suitable polymers include, by way of example, any material that can be formed into a film, including, but not limited to, polyolefins and polyacrylates, as well as copolymers and blends thereof. Specific polymers include, but are not limited to, polyethylene, low density polyethylene, linear low density polyethylene, and ethylene vinyl acetate. Other options include inexpensive materials used by themselves or in combination such as pellon (a non-woven material), fabric, cloth, nylon, latex, Mylar, water resistant or repellant materials, absorbent, padded, antibacterial, or recycled material. These materials can be single or multi-layered.

The term "non-woven" fiber material refers generally to materials having a structure of individual fibers or threads that are interlaid, but not in a regular, repetitive manner as in a knitted fabric. Nonwovens provide cloth-like aesthetics at a lower cost than typical knitted fabrics. Nonwoven fabrics or webs may be formed from many processes such as for example, meltblowing processes, spunbonding processes, conforming processes, spunbonding/meltblowing/spunbonding processes and bonded carded web processes. These processes are well known in the hygiene, arts, and non-woven materials are readily commercially available. For example, non-woven laminates have been available commercially for years from Kimberly-Clark Corporation under marks such as Spunguard®, and Evolution®. Base sheet 10 may be substantially liquid impermeable, or may be liquid-permeable.

Alternatively, base sheet 12 may be made from a material that exhibits elastic properties, thereby reducing or eliminating the need for a separate elastic member 50. Elastic sheet materials are known in the art. For example, U.S. Pat. No. 6,207,637 to Haffner discloses an elastic nonwoven web or film manufactured from a thermoplastic polymer. U.S. Pat. No. 6,096,668 discloses an elastic liquid impermeable laminate. U.S. Pat. No. 6,001,460 discloses a laminate material formed of an elastomeric polymer sheet and a non-woven fabric sheet. Other suitable elastic sheet materials are known to those skilled in the art.

Cover 10 may be manufactured using conventional web manufacturing processes, which are known in the art. For example, the raw material from which base sheet 12 is made may be purchased in bulk, typically on a roll. The roll may be positioned at a first end of a web manufacturing line, and one end of the roll may be attached to a drum at the opposite end of the line. Perforations 32, 34, 36, 38, and optionally 40, 42, 44, and 46 may be formed in base sheet 12 in a first operation in the web line. In addition, perforations may be formed between adjacent covers in the line to facilitate the removal of covers from the web. One method of mechanically aperturing a film is described in U.S. Pat. No. 4,820,294 to Morris, which is incorporated herein in its entirety by reference. As described in Morris, a supply of film is brought into pressure contact with a plurality of pins or needles mounted on a rotatable roll. The pins are then withdrawn from the film, leaving the desired apertures. Other methods of aperturing films and other materials include the process of vacuum aperturing films described in U.S. Pat. No. 3,929,135 to Thompson; the process of aperturing meltblown nonwovens described in U.S. Pat. No. 4,469,734 to Minto; and the process of aperturing films and other substrates described in German Patent No. 26 14 160 to Endler and in European Patent Application No. 0 598 970 A1 to Giacometti.

Optionally, elastic band 50 may be applied at a second position in the web manufacturing line. Elastic band 50 may be adhered, stitched, or otherwise connected to the base sheet 12. Methods for attaching elastic to continuous webs are known in the web manufacturing arts. For example, U.S. Pat. Nos. 6,197,138 and 6,382,290 discloses a machine and process for bonding an elastic member to a moving substrate web while the elastic member is in an un-stretched condition. Similarly, U.S. Pat. No. 5,500,063 discloses a method for joining an elastic band to a continuously moving, partially elastic substrate.

Optionally, adhesive strips 54, 56 may be applied in a third operation in the manufacturing process. Adhesive strips 54, 56 may be applied in continuous strips during the manufacturing process.

Optionally, information may be printed on the front and/or back surface of base sheet 10 in a fourth operation in the manufacturing process. Printing processes for web-based manufacturing processes are known in the art. For example, U.S. Pat. No. 5,853,859 discloses a process for latex printing on fabrics. Other suitable printing processes include ink-jet printing processes and lithographic printing processes.

The particular order in which the operations are conducted in the manufacturing process are not critical to the present invention. It will be appreciated that the order of the operations may be altered, or that certain operations may be omitted. Also, it will be appreciated that a continuous web-based manufacturing process is not required; covers in accordance with the present invention could be made in a piece-by-piece process.

A plurality of disposable seat covers in accordance with the present invention may be pre-packaged for distribution to consumers. In an exemplary embodiment, a continuous web comprising a plurality of seat covers may be wound about a central axis or a core into a roll for distribution. In an alternate embodiment, a plurality of disposable web covers may be placed adjacent one another in a stack in a package for distribution. Portions of the seat covers in the stack may be interleaved to facilitate their removal from the package, analogous to the manner in which tissues are removed from a box.

Figure 9:
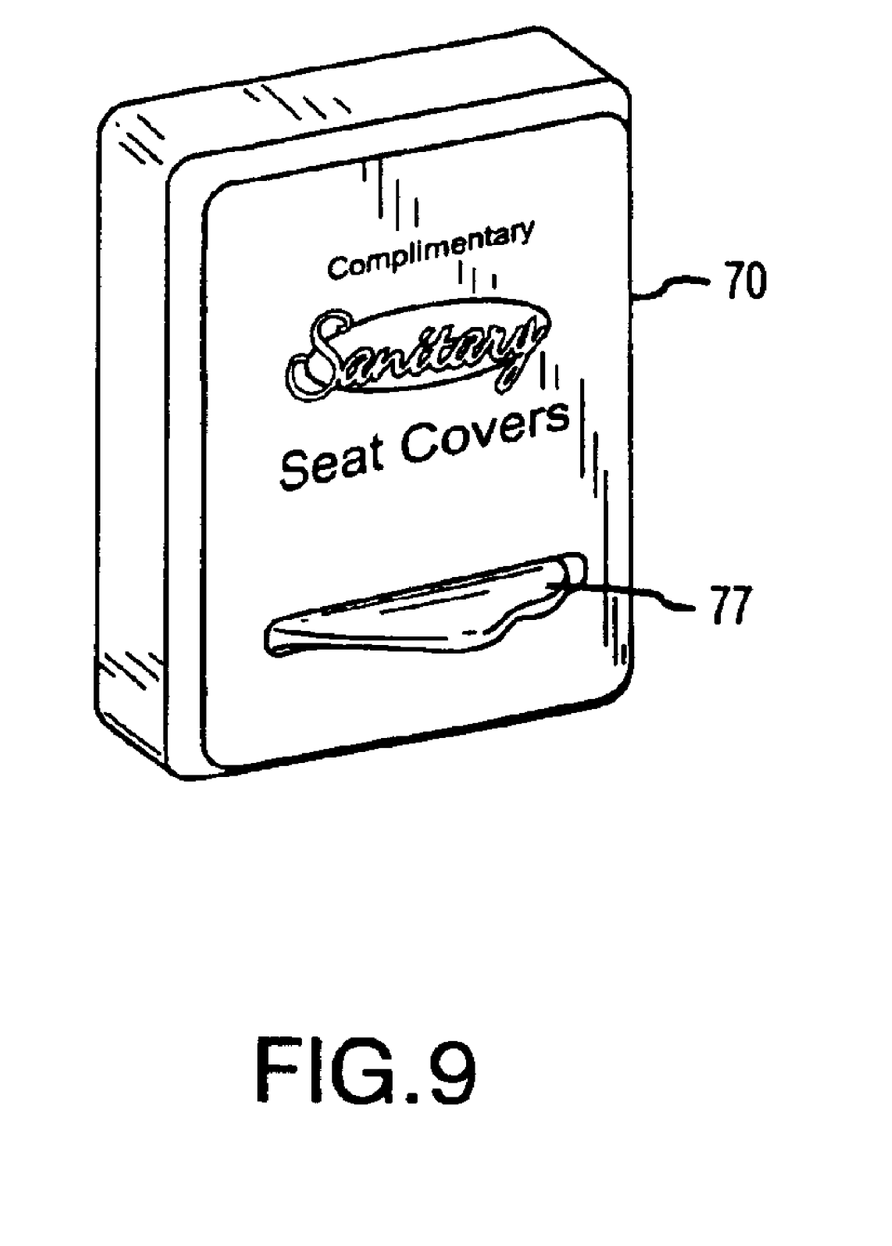
FIG. 9 is a perspective view of an exemplary dispenser for use with sanitary seat covers in accordance with the present invention.

FIG. 9 is a perspective view of an exemplary dispenser for distributing disposable sanitary seat covers in accordance with the present invention. Dispenser may be a wall-mountable housing 70 defining an interior chamber and having an aperture 72 located in one of the walls of the housing, through which disposable seat covers 10 located in the interior chamber of the housing 72 may be dispensed. In use, a consumer removes a disposable seat cover from the housing and applies it to a seat, as indicated in FIGS. 5–6.

In alternate embodiments cover 10 may be formed from a multi-layered construction. For example, the base sheet may be a first layer, and a separate top sheet may be applied to define all or a part of the seating area. In addition pockets may be formed on the corners to facilitate securing the cover to the underlying seat.

It is noted that the embodiment of the disposable sanitary seat cover described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A disposable sanitary seat cover, comprising:
   a first sheet of material having a front side and a back side, the sheet defining a seat portion, wherein the sheet includes a predefined removable section that may be separated from the sheet; and
   an adhesive strip secured to the back side of the first sheet of material, wherein the seat portion comprises at least one passage adapted to permit a child's legs to pass through the first sheet, and wherein the seat portion includes an elastic member that circumscribes the seat portion.

2. The disposable sanitary cover of claim 1, wherein the restraining device is a seat belt for a shopping cart.

3. The disposable sanitary cover of claim 1, wherein the restraining device secures the cover to a high chair.

4. The disposable sanitary seat cover of claim 1, wherein the seat portion further comprises a third passage and a fourth passage, wherein the third and fourth passages are adapted to permit a restraining device to pass through the first sheet.

5. The disposable sanitary cover of claim 1, wherein said at least one passage comprises a first passage and a second passage.

6. A disposable sanitary seat cover, comprising:
   a first sheet of material having a front side and a back side, the sheet defining a seat portion, wherein the sheet includes a predefined removable section that may be separated from the sheet; and
   an adhesive strip secured to the back side of the first sheet of material, wherein the seat portion comprises a first perforated area and a second perforated area, and wherein the first and second perforated areas, when torn, permit a child's legs to pass through the first sheet, and wherein the seat portion includes an elastic member that circumscribes the seat portion.

7. The disposable sanitary seat cover of claim 6, wherein the first and second perforated areas each form a line.

8. The disposable sanitary seat cover of claim 6, wherein the first and second perforated areas each form a cross.

9. The disposable sanitary seat cover of claim 6, wherein the seat portion comprises a third perforated area and a fourth perforated area, and wherein the third and fourth perforated areas, when torn, permit a restraining device to pass through the first sheet.

* * * * *